(12) United States Patent
Saeedi et al.

(10) Patent No.: US 11,490,090 B2
(45) Date of Patent: Nov. 1, 2022

(54) TEXT AND LINE DETECTION IN VIDEO ENCODE BY USING CO-SITED GRADIENT AND VARIANCE VALUES

(71) Applicant: ATI Technologies ULC, Markham (CA)

(72) Inventors: Mehdi Saeedi, Markham (CA); Sai Harshita Tupili, Toronto (CA); Yang Liu, Toronto (CA); Mingkai Shao, Markham (CA); Gabor Sines, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/138,812

(22) Filed: Dec. 30, 2020

(65) Prior Publication Data
US 2022/0210429 A1 Jun. 30, 2022

(51) Int. Cl.
*H04N 19/136* (2014.01)
*H04N 19/103* (2014.01)
*H04N 19/172* (2014.01)

(52) U.S. Cl.
CPC ......... *H04N 19/136* (2014.11); *H04N 19/103* (2014.11); *H04N 19/172* (2014.11)

(58) Field of Classification Search
CPC ........................... H04N 19/136; H04N 19/103
See application file for complete search history.

(56) References Cited

U.S. PATENT DOCUMENTS

| | | | | |
|---|---|---|---|---|
| 2007/0074251 A1* | 3/2007 | Oguz | .................. | H04N 19/105 725/45 |
| 2007/0171988 A1* | 7/2007 | Panda | .................. | H04N 19/137 375/E7.181 |
| 2014/0140395 A1* | 5/2014 | Kim | ...................... | H04N 19/119 375/240.03 |
| 2019/0132591 A1* | 5/2019 | Zhang | ...................... | G06N 3/10 |
| 2020/0382278 A1* | 12/2020 | Xu | ........................ | G06K 9/6256 |
| 2020/0382778 A1* | 12/2020 | Mao | ....................... | G06F 17/18 |

OTHER PUBLICATIONS

Du, Y., et. al., "Automated System for Text Detection in Individual Video Images", Journal of Electronic Imaging vol. 12, No. 3, 14 pgs., Jul. 2003.

* cited by examiner

*Primary Examiner* — Jerry T Jean Baptiste
(74) *Attorney, Agent, or Firm* — Volpe Koenig

(57) ABSTRACT

Methods and devices are provided for encoding video. By using co-sited gradient and variance values to detect text and line in frames of the video. A processor is configured to receive a plurality of frames of video, determine, for a portion of a frame, a variance of the portion of the frame and a gradient of the portion of the frame and encode, using one of a plurality of different encoding qualities, the portion of the frame based on the gradient and the variance of the portion of the frame. Encoding is performed at both the sub-frame level and frame level. The portion of the frame is classified into one of a plurality of categories based on the gradient and variance and encoded based on the category.

20 Claims, 4 Drawing Sheets

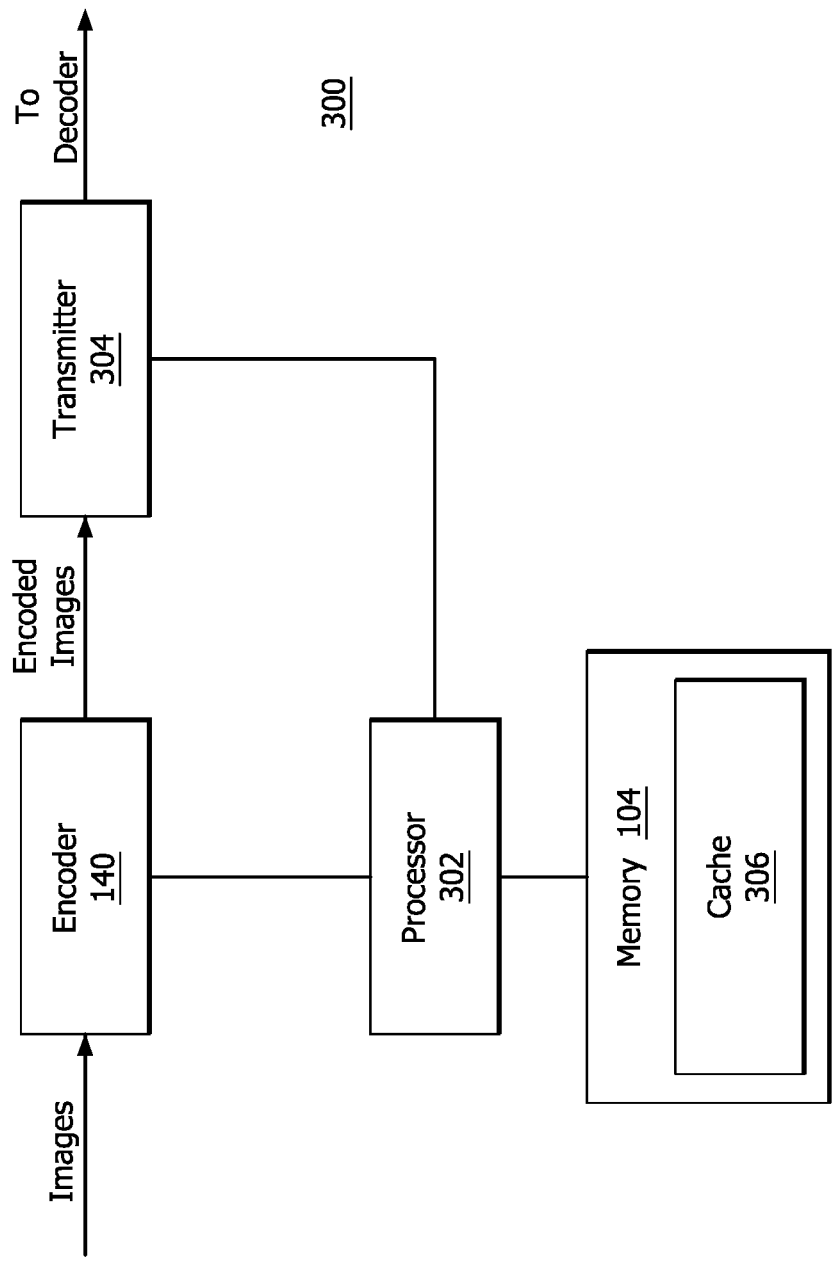

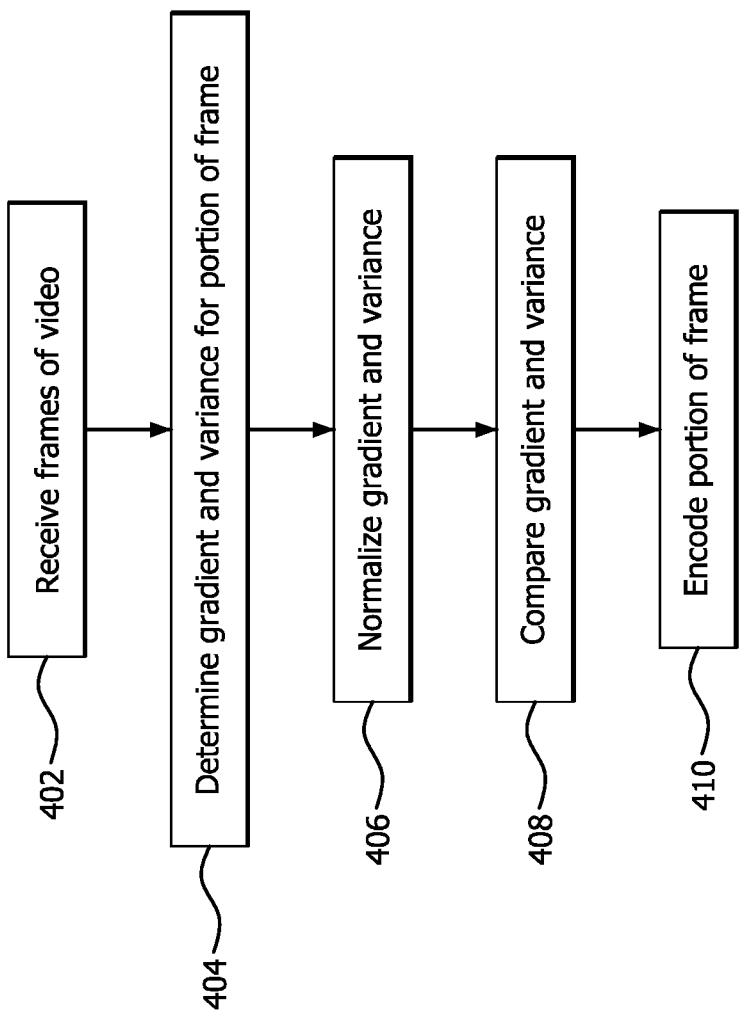

TEXT AND LINE DETECTION IN VIDEO ENCODE BY USING CO-SITED GRADIENT AND VARIANCE VALUES

BACKGROUND

Video encoding (compression) reduces the number of bits used to represent the content in a video sequence. The goal of video encoding is to reduce the size of the video data while maintaining video quality. For example, in block-based video encoding, a video frame is divided into blocks of pixels, with each pixel having a value (e.g., luminance values and chrominance values) represented by one or more bits. The frames are encoded by separately encoding (e.g., compressing) and decoding (e.g., decompressing) each block of pixels prior to displaying the frames.

BRIEF DESCRIPTION OF THE DRAWINGS

A more detailed understanding can be had from the following description, given by way of example in conjunction with the accompanying drawings wherein:

FIG. 3 is a block diagram illustrating exemplary components of a processing device in which one or more features of the disclosure can be implemented; and FIG. 4 a flow diagram illustrating an example video encoding method according to features of the disclosure.

DETAILED DESCRIPTION

Figure 1:
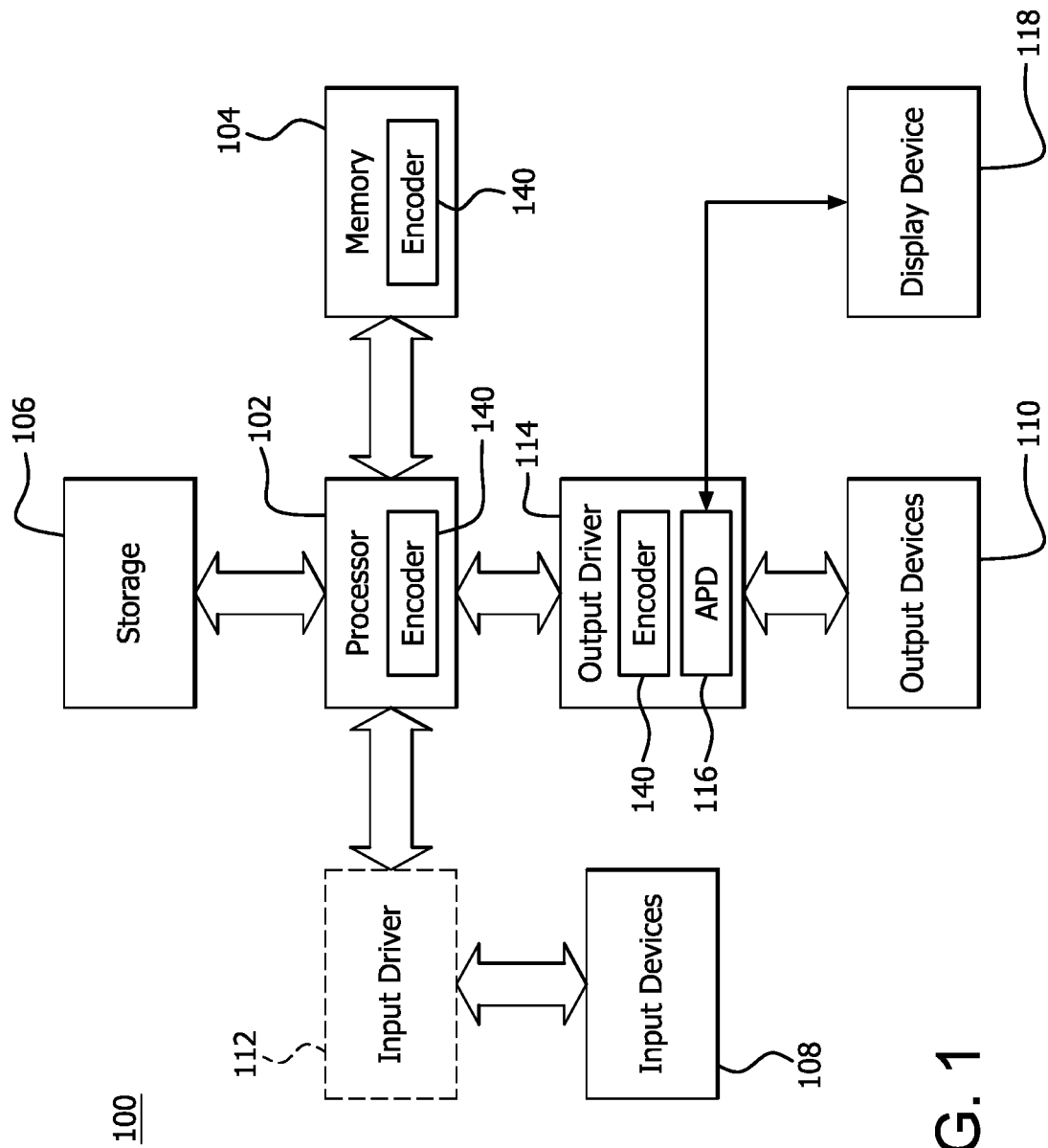
FIG. 1 is a block diagram of an example device in which one or more features of the disclosure can be implemented.

As described herein, a portion of a frame includes the frame itself or a sub-frame portion (e.g., a block of pixels, a slice, at tile or other sub-frame portion) of the frame.

Images (frames) to be displayed typically include regions having different levels of complexity. For example, frames typically include regions having lower complexity and regions with higher complexity (e.g., regions with lines, text and object borders). Efficient encoding (i.e., reducing the size of the frame data while maintaining visual quality or visual perception) of the frames is facilitated by encoding different regions with a different encoding quality (e.g., a different quantization parameter (QP)) based on the complexity of the region.

Conventional line detection techniques include detecting vertical lines based on a horizontal gradient (i.e., based on differences in values between target pixels and adjacent pixels above and below target pixels) and detecting horizontal lines based on the vertical gradient (i.e., based on differences in values between target pixels and adjacent pixels before and after the target pixels on the row of the target pixels) as well as detection of lines based on mean absolute differences, which are similar to gradient calculations. Conventional text detection techniques include detection of scene text and superimposed text within a frame by using multistage pulse code modulation, text region detection, a text box determination and optical character recognition, machine learning, deep learning and special filtering. Although variance and gradient can be used to measure content complexity, gradient is more sensitive to the directional pattern, while variance does not distinguish between directional and non-directional activities.

Features of the present disclosure exploit differences between variance and gradient values for a portion of a frame (i.e., co-sited gradient and variance values) to identify different content types of a frame (image). That is, the combination of the variance and gradient metrics are utilized, at both the sub-frame (e.g., block) level and frame level, to determine information for the nature of the content (e.g., presence of text and lines in the frame).

Features of the present disclosure include classifying portions of frames according to different categories to determine different encoding qualities (e.g., different encoding parameters) of each portion. The encoding parameter (e.g., (the QP) is adjusted or maintained for a portion of a frame (i.e., the frame itself or a sub-frame portion) based on the category of the portion of the frame.

In various alternatives, features of the present disclosure are implemented in a single pass encode, a multi-pass encode as well as in pre-analysis stage.

A video encoding method is provided which comprises receiving a plurality of frames of video, determining, for a portion of a frame, a variance of the portion of the frame and a gradient of the portion of the frame and encoding, using one of a plurality of different encoding qualities, the portion of the frame based on the gradient and the variance of the portion of the frame.

A processing device is provided which comprises memory and a processor. The processor is configured to receive a plurality of frames of video, determine, for a portion of a frame, a variance of the portion of the frame and a gradient of the portion of the frame and encode, using one of a plurality of different encoding qualities, the portion of the frame based on the gradient and the variance of the portion of the frame.

A non-transitory computer readable medium is provided which comprises instructions for causing a computer to execute a video encoding method comprising receiving a plurality of frames of video, determining, for a portion of a frame, a variance of the portion of the frame and a gradient of the portion of the frame and encoding, using one of a plurality of different encoding qualities, the portion of the frame based on the gradient and the variance of the portion of the frame.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

A video encoder 140 is shown in two different alternative forms. In a first form, the encoder 140 is software that is stored in the memory 104 and that executes on the processor 102 as shown. In a second form, the encoder 140 is at least a portion of a hardware video engine (not shown) that resides in output driver 114. In other forms, the encoder 140 is a combination of software and hardware elements, with the hardware residing, for example, in output drivers 114, and the software executed on, for example, the processor 102.

Figure 2:
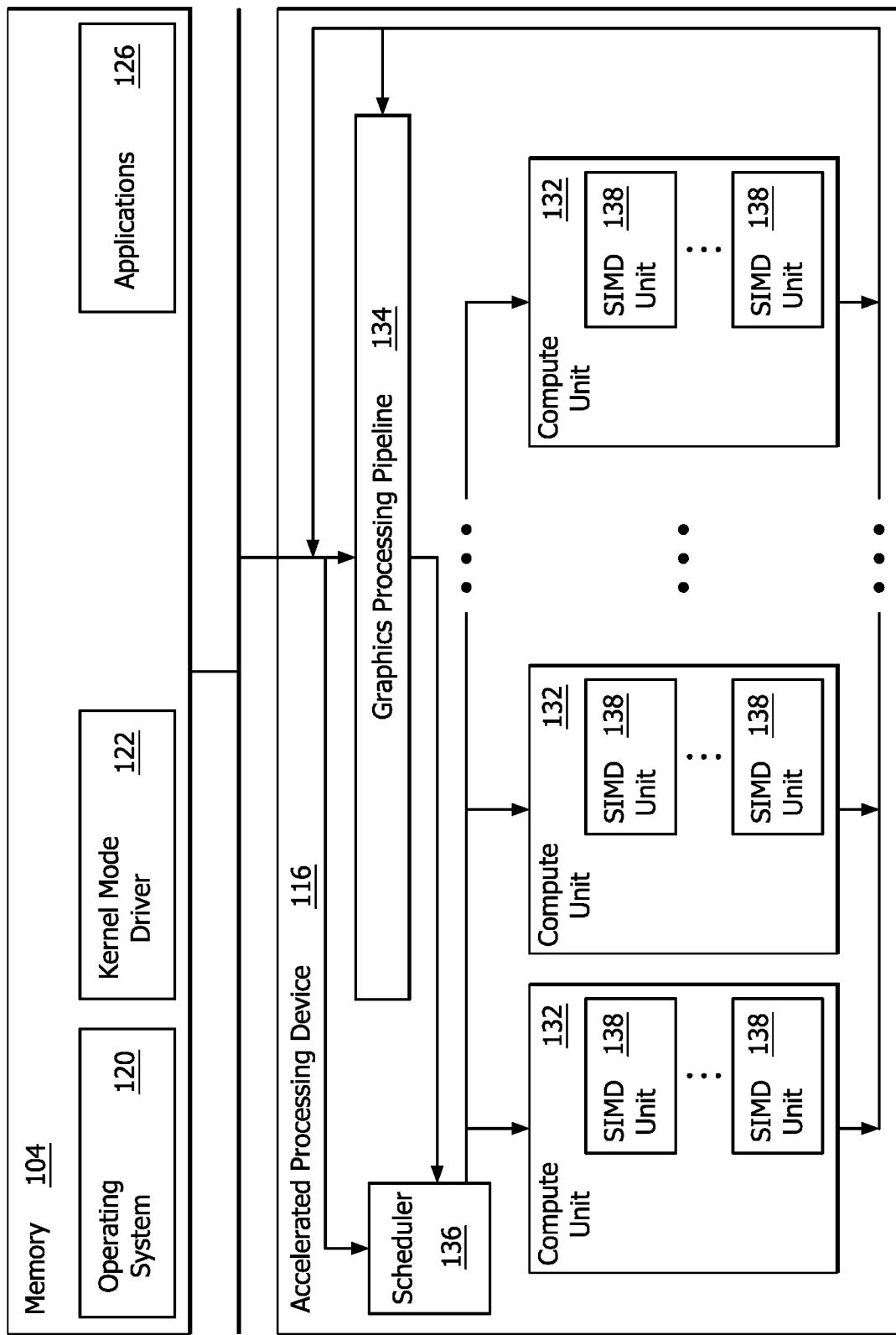
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

FIG. 3 is a block diagram illustrating exemplary components of a processing device 300 in which one or more features of the disclosure can be implemented. Processing device 300 is used to process and compress panoramic video images as described in more detail below. As shown in FIG. 3, processing apparatus 300 comprises processor 302, encoder 140, transmitter 304 and memory 104, including cache 306

Processor 302 is, for example, processor 102 (shown in FIG. 1), APD 116 (shown in FIGS. 1 and 2)) or one or more compute units 132. As shown in FIG. 3, processor 302 is in communication with encoder 140, transmitter 304 and memory 104, which includes cache 306. Encoder 140 is configured to receive video images and instructions from processor 302 and encode the video images to be decoded by a decoder (not shown) and displayed. The video images may be received from one or more video sources, such as a video capture device (e.g., a camera), a storage device (e.g., storage 106), a video content provider, and a device for generating graphics (e.g., APD 116).

Transmitter 304 is configured to receive the encoded images and provide the encoded images to be decoded and provided for display. The encoded video images are sent, for example, via a network interface controller (NIC) over one or more networks (e.g., local area network), including wired (e.g., Ethernet) or wireless networks (e.g., via WiFi, Bluetooth, and other wireless standards). Alternatively, transmitter 304 is configured to transmit the encoded video images to a decoder on the same processing apparatus 300 (e.g., via a local device bus).

Processor 302 is configured to perform various functions as described herein. Processor 302 is configured to receive a plurality of frames of video. The processor 302 is configured to determine, for a portion of the frame, a variance of the portion and a gradient of the portion and encode, using one of a plurality of different encoding qualities, the portion of the frame based on the gradient of the portion and the variance of the portion.

The processor 302 is also configured to classify (e.g., assign) the portion as one of a plurality of categories based on a comparison of the gradient of the block and the variance of the block. For example, processor 302 determines whether the block belongs to a first category which includes lines and text in flat regions (e.g., regions in which pixel values are the same or close to the same, a second category which includes a border of objects (e.g., inanimate objects or people) or a third category which does not include the first category or the second category. Processor 302 encodes the blocks with different qualities based on the determined category of the block (e.g., the visual importance of the block).

The gradient of a portion of a frame (e.g., frame or sub-frame portion) can also be calculated in various ways. For example, the gradient can be calculated as the sum of absolute differences (SAD) between pixels in a reference block in the reference image. Equation 1 below shows one example of calculating the gradient. As shown in the example below in Equation 1, the gradient for an n×n block is calculated by the sum of the horizontal gradient and vertical gradient as:

$$S_U(X) = \sum_{\substack{0 \leq i \leq n-2 \\ 0 \leq j \leq n-2}} (|X_{i,j} - X_{i+1,j}| + |X_{i,j} - X_{i,j+1}|) \quad \text{Equation 1}$$

where $X_{i,j}$ is the value of the pixel at (i, j).

For simplification purposes the example shown in Equation 1 is used for a block of pixels. The gradient can be calculated, however, for any portion (i.e., any number of pixels) of a frame. Also, the variables (e.g., n–2 bound) shown in Equation 1 are merely shown as an example for simplification purposes. Calculation of the gradient can include variables (e.g., n–1 bound) other than those shown in Equation 1.

Likewise, the variance of a portion of a frame (e.g., frame or sub-frame portion) can also be calculated in various ways. For example, the variance can be calculated for a n×n block as the sum of the squared differences of each pixel from the mean of the block as:

$$S(X) = \sum_{i=1}^{m}(X_i - \overline{X})^2, \overline{X} = \frac{\sum_{i=1}^{m} X_i}{m} \quad \text{Equation 2}$$

where m is n×n and $X_i$ is the value of the pixel i in m pixels.

For simplification purposes, the example shown in Equation 2 is also used for a block of pixels. The variance can be calculated, however, for any portion (i.e., any number of pixels) of a frame. Also, the variables (e.g., n–2 bound) shown in Equation 2 are merely shown as an example for simplification purposes. Calculation of the variance can include variables (e.g., n–1 bound) other than those shown in Equation 2.

As described above, frames (images) to be displayed typically include regions of different levels of complexity (e.g., regions with lower complexity and regions with higher complexity, such as for example, regions with lines, text and object borders. Although different regions are highly complex, the encoding qualities for each of these highly complex regions are distinguished based on comparison of the gradient and variance.

For example, the gradient is first multiplied by a weighting factor (e.g., for a block size of 16×16, a weighting factor of 128 is assigned) to normalize the gradient and variance values. When an absolute value of the difference between the gradient and the variance is equal to or greater than a predetermined threshold, the encoding quality is increased (e.g., the QP is decreased). For example, when the gradient of a block is equal to or greater than a variance of the block by a threshold amount, the block is determined to be in a first category. The first category is an indication that the block includes lines and text in flat areas of the image and the encoding quality is increased (e.g., the QP is decreased).

When the variance of the block is, for example, equal to or greater than the gradient of the block by a threshold amount, the block is determined to be in a second category. The second category is an indication that the block includes the border (e.g., edge) between elements (e.g., objects and people) of an image and the encoding quality is also increased (e.g., the QP is decreased).

When the absolute value of the difference between the gradient and the variance is not equal to or greater than a predetermined threshold for a block of the frame, the block is determined to be in a third category, and the encoding quality is not increased (e.g., the QP is not decreased).

That is, the blocks determined to be in the first category or in the second category are encoded with a higher quality than the blocks determined to be in the third category.

The values of the gradient and the variance can also be reshaped, using a transfer function, and combined such that blocks with different characteristics belong to different output regions.

In an example, a learning mechanism (e.g., a machine learning model) is trained to map different blocks to different categories. For example, when each block is assigned to a category, classification of a block is combined by counting the ratio of different block types to identify the frame type.

FIG. 4 is a flow diagram illustrating an example video encoding method 400 according to features of the disclosure.

As shown at block 402, the method 400 includes receiving a plurality of frames of video. The frames of video are received from one or more video sources, such as a video capture device (e.g., a camera), a storage device (e.g., storage 106), a video content provider, and a device for generating graphics (e.g., APD 116).

As shown at block 404, the method 400 includes determining, for a portion of a frame, a variance of the portion of the frame and a gradient of the portion of the frame.

For example, the gradient of a n×n block of pixels is calculated as the sum of absolute differences (SAD) between pixels in a block of a reference image, as described above in Equation 1 and the variance for the n×n block is calculated as the sum of the squared differences of each pixel from the mean of the block, as described above in Equation 1.

As shown at block 406, the method 400 includes normalizing the gradient and variance values of the portion of the frame. For example, the gradient is multiplied by a weighting factor (e.g., for a block size of 16×16, a weighting factor of 128 is assigned).

As shown at block 408, the method 400 includes comparing the gradient of the portion of the frame to the variance of the portion of the frame and the portion of the frame is encoded, at block 410, based on the gradient and the variance of the portion of the frame.

For example, the portion of the frame is determined to be in one of three different categories based on the comparison of the gradient and variance of the portion of the frame. It is determined (e.g., by processor 302) whether the portion of the frame belongs to a first category which includes lines and text in flat areas, a second category which includes a border of objects (e.g., inanimate objects or people) or a third category which does not include the first category or the second category.

When an absolute value of the difference between the gradient and the variance is equal to or greater than a predetermined threshold, the encoding quality is increased (e.g., the QP is decreased). For example, when the gradient of a block is equal to or greater than a variance of the block by a threshold amount, the block is determined to be in a first category. The first category is an indication that the block includes lines and text in flat areas of the image and the encoding quality is increased (e.g., the QP is decreased).

When the variance of the block is, for example, equal to or greater than the gradient of the block by a threshold amount, the block is determined to be in a second category. The second category is an indication that the block includes the border (e.g., edge) between elements (e.g., objects and people) of an image and the encoding quality is also increased (e.g., the QP is decreased).

When the absolute value of the difference between the gradient and the variance is not equal to or greater than a predetermined threshold for a block of the frame, the block is determined to be in a third category, and the encoding quality is not increased (e.g., the QP is not decreased).

That is, the blocks determined to be in the first category or in the second category are encoded with a higher quality than the blocks determined to be in the third category.

The values of the gradient and the variance can also be reshaped, using a transfer function, and combined such that blocks with different characteristics belong to different output regions. In an example, a learning mechanism (e.g., a machine learning model) is trained to map different blocks to different categories. For example, when each block is assigned to a category, classification of a block are combined by counting the ratio of different block types to identify the frame type.

It should be understood that many variations are possible based on the disclosure herein. Although features and elements are described above in particular combinations, each feature or element can be used alone without the other features and elements or in various combinations with or without other features and elements The various functional units illustrated in the figures and/or described herein (including, but not limited to, the processor 102, 302, the input driver 112, the input devices 108, the output driver 114, the output devices 110, the accelerated processing device 116, the graphics processing pipeline 134, the compute units 132, the SIMD units 138, encoder 140, transmitter 304 and cache 306 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A video encoding method comprising:
receiving a plurality of frames of video;
determining, for a portion of a frame, a variance value of the portion of the frame and a gradient value of the portion of the frame; and
encoding, using one of a plurality of different encoding qualities, the portion of the frame based on a comparison of a difference between the gradient value of the portion of the frame and the variance value of the portion of the frame to a threshold.

2. The video encoding method of claim 1, wherein the portion of the frame is a sub-frame portion of the frame.

3. The video encoding method of claim 2, wherein the sub-frame portion of the frame is a block of pixels.

4. The video encoding method of claim 1, wherein the portion of the frame is the frame.

5. The video encoding method of claim 1, further comprising:
comparing the gradient value to the variance value; and
determining the difference between the gradient of the portion of the frame and the variance of the portion of the frame based on the comparing of the gradient value to the variance value.

6. The video encoding method of claim 1, further comprising:
increasing an encoding quality of the portion of the frame when an absolute value of the difference between the gradient and the variance is equal to or greater than the threshold; and
when the absolute value of the difference between the gradient and the variance is less than the threshold, performing one of:
maintaining the encoding quality; and
decreasing the encoding quality.

7. The video encoding method of claim 1, further comprising:
determining whether the portion of the frame is one of a plurality of categories comprising:
a first category which includes lines and text in flat areas of the frame;
a second category which includes a border of objects of the frame; and
a third category which does not include the first category or the second category.

8. The video encoding method of claim 7, further comprising:
when the portion of the frame is determined to be the one of the first category and the second category, increasing an encoding quality of the portion of the frame; and
when the portion of the frame is determined to be the third category, performing one of:
maintaining the encoding quality; and
decreasing the encoding quality.

9. The video encoding method of claim 1, wherein the plurality of frames of video are provided for display at a display device.

10. A processing device comprising:
memory; and
a processor configured to:
receive a plurality of frames of video;
determine, for a portion of a frame, a variance value of the portion of the frame and a gradient value of the portion of the frame; and
encode, using one of a plurality of different encoding qualities, the portion of the frame based on a comparison of a difference between the gradient value of the portion of the frame and the variance value of the portion of the frame to a threshold.

11. The processing device of claim 10, wherein the portion of the frame is a sub-frame portion of the frame.

12. The processing device of claim 11, wherein the sub-frame portion of the frame is a block of pixels.

13. The processing device of claim 10, wherein the portion of the frame is the frame.

14. The processing device of claim 10, wherein the processor is configured to:
compare the gradient of the portion to the variance of the portion; and
determining the difference between the gradient of the portion of the frame and the variance of the portion of the frame based on the comparison of the gradient value to the variance value.

15. The processing device of claim 10, wherein the processor is configured to:
increase an encoding quality of the portion of the frame when an absolute value of the difference between the gradient and the variance is equal to or greater than the threshold; and
when the absolute value of the difference between the gradient and the variance is less than the threshold, perform one of:
maintaining the encoding quality; and
decreasing the encoding quality.

16. The processing device of claim 10, wherein the processor is configured to:
determine whether the portion of the frame is one of a plurality of categories comprising:
a first category which includes lines and text in flat areas of the frame;
a second category which includes a border of objects of the frame; and
a third category which does not include the first category or the second category.

17. The processing device of claim 16, wherein the processor is configured to:
increase an encoding quality of the portion of the frame when the portion of the frame is determined to be the one of the first category and the second category; and
when the portion of the frame is determined to be the third category, performing one of:
maintaining the encoding quality; and
decreasing the encoding quality.

18. The processing device of claim 10, further comprising a display device and the plurality of frames of video are provided for display at the display device.

19. A non-transitory computer readable medium comprising instructions for causing a computer to execute a video encoding method comprising:
receiving a plurality of frames of video;
determining, for a portion of a frame, a variance value of the portion of the frame and a gradient value of the portion of the frame; and
encoding, using one of a plurality of different encoding qualities, the portion of the frame based on a comparison of a difference between the gradient value of the portion of the frame and the variance value of the portion of the frame to a threshold.

20. The computer readable medium of claim 19, wherein the instructions further comprise:
comparing the gradient value to the variance value; and determining the difference between the gradient of the portion of the frame and the variance of the portion of the frame based on the comparing of the gradient value to the variance value.

* * * * *